(12) United States Patent
Daniel

(10) Patent No.: US 6,220,648 B1
(45) Date of Patent: Apr. 24, 2001

(54) HAIL PROTECTIVE SHIELD

(76) Inventor: Steven B. Daniel, 705 Robert's Cut-Off, Ft. Worth, TX (US) 76114

( * ) Notice: Subject to any disclaimer, the term of this patent is extended or adjusted under 35 U.S.C. 154(b) by 0 days.

(21) Appl. No.: 09/542,093

(22) Filed: Apr. 3, 2000

(51) Int. Cl.$^7$ ........................................ B60J 11/00
(52) U.S. Cl. ............................. 296/136; 296/95.1
(58) Field of Search ..................... 296/95.1, 98, 136; 150/166, 168; 160/370.21; 52/3

(56) References Cited

U.S. PATENT DOCUMENTS

| | | | |
|---|---|---|---|
| 3,958,385 | * 5/1976 | Biondra, Jr. et al. | 52/631 |
| 4,810,015 | 3/1989 | McNeil . | |
| 5,242,206 | 9/1993 | Heck . | |
| 5,275,460 | * 1/1994 | Kraus | 296/95.1 X |
| 5,290,618 | * 3/1994 | Olson et al. | 150/166 X |
| 5,343,915 | * 9/1994 | Newsome | 150/166 |
| 5,356,191 | * 10/1994 | Sheeham | 296/95.1 |
| 5,401,074 | 3/1995 | Timerman . | |
| 5,429,406 | * 7/1995 | Huang | 296/95.1 |
| 5,476,127 | 12/1995 | Fournier . | |
| 5,497,819 | * 3/1996 | Chiang | 150/166 |
| 5,664,825 | 9/1997 | Henke et al. . | |
| 5,834,381 | * 11/1998 | Roe et al. | 296/95.1 X |
| 6,048,017 | * 4/2000 | Doshi | 296/39.2 |
| 6,070,629 | * 6/2000 | Whiteside | 150/166 |

FOREIGN PATENT DOCUMENTS

0097421  * 4/1988 (JP) ........................ 296/136

* cited by examiner

*Primary Examiner*—D. Glenn Dayoan
*Assistant Examiner*—Lori L. Coletta
(74) *Attorney, Agent, or Firm*—Robert H. Frantz

(57) ABSTRACT

A hail shield which consists of a laminated design, having multiple layers of resilient shock-absorbing material for padding, strength and shape. An outer layer of high density polyethylene ("HDPE") mesh is layered with closed cell foam to produce a 2-ply covering material. In a preferred embodiment, a thin vinyl scrim or polyethylene sheet is layered between the HDPE mesh and the closed cell foam to provide a 3-ply covering material. The shield is constructed of two generally rectangular top panels affixed to each other along their common longest sides, each top panel being flanked by generally trapezoidally-shaped side panels. The seams between the panels are preferably constructed using a sewing technique which produces a reflexive joint between the panels, tending to fold the panels towards each other, and giving the over all hail shield a reflexive tendency to "grip" the car to increase the attachment security of the shield. The outer edges of the panels are bordered by sleeves through which elastic shock cords pass. Hooks affixed to the ends of the shock cords provide the means for attachment to the car's exterior at points such as holes in wheels or wheel covers. The design of the car shield allows for compact folding and rolling of the shield for convenient storage in a duffle-type bag in the car trunk when not in use.

4 Claims, 7 Drawing Sheets

HAIL PROTECTIVE SHIELD

TECHNICAL FIELD OF THE INVENTION

This invention relates to the protection of vehicles from the damaging impacts by hail or other falling objects. This invention pertains especially to the arts of padded, removable and collapsible car and vehicle covers which have integral attachment means.

CROSS-REFERENCE TO RELATED APPLICATIONS

Not applicable.

FEDERALLY SPONSORED RESEARCH AND DEVELOPMENT STATEMENT

This invention was not developed in conjunction with any Federally-sponsored contract.

MICROFICHE APPENDIX

Not applicable.

BACKGROUND OF THE INVENTION

Large hailstones can reach extreme velocities and transmit and deliver destructive energy to vehicles. Hailstones 10 cm (4 inches) in diameter fall on the average at a speed of 40 meters per second (88 miles per hour). Even small hailstones can cause serious and permanent damage to car and truck sheet metal panels and glass surfaces. In 1991 U.S. property damage from hail was estimated to be in the millions of dollars.

Most of the automobile covers on the market are designed to protect the vehicle from dust, rain, and sun light, and most do not have a padding layer to provide protection from falling hailstones or debris. One such cover is the design disclosed in U.S. Pat. No. 5,476,127 to Fournier.

However, some covers are known in the art, but most have disadvantages to the level of protection they provide, their ease of installation, and/or their ease of storage. One automobile hail shield described in U.S. Pat. No. 5,242,206 to Heck includes a plurality of "fluid-filled" inflatable chambers. In reality, the Heck patent discloses a method to inflate the chambers with compressed air from an air compressor pump or by transfer of pressurized air from a vehicle tire. While this design may provide a substantial level of protection, it cannot be installed and removed quickly due to the time necessary to inflate and deflate the chambers. Additionally, if tire air pressure is used for the inflation source, the vehicle may be left with a flat tire.

Another hail shield described in U.S. Pat. No. 5,401,074 to Timerman, which includes several strips of thick foam rubber spaced apart on a cloth cover. The thick foam strips keep the cloth cover spaced from the surface of the car provide a buffer space to absorb the energy of the falling hailstones. This design also may provide reasonable protection, but is not easily collapsed for storage due to the thickness of the foam strips.

Yet another hail shield as set forth in U.S. Pat. No. 5,664,825 uses a similar technique of multiple cushioning elements, but in this case the cushioning material is comprised of multiple plastic rods which are quilted together into a textile-based car cover. Again, while this design can be rolled up in one direction, it cannot be easily folded lengthwise with respect to the rod lengths.

A design which rolls up into a desirable shape is described in U.S. Pat. No. 4,810,015, but it is suitable only for the protection of the side panels of a car from impacts by other car doors ("door dings"), and is not designed to protect the top surfaces of a car.

Further, most car covers and hail shields of the prior art employ adjustable length straps or lengths of elastic cord to affix them to the car. In the case of the elastic cord, most designs include only a length of cord sufficient to stretch between the mounting point on the car to a close-by corner or edge of the cover material, producing a material stress point where the cord attaches to the cover material and requiring the cover material itself to endure the stress of being pulled at opposite ends by opposing cords. These types of attachment schemes are typically not suitable for use in high winds, such as often accompany strong storms or while the car is being transported on a truck.

Therefor, there is a need in the art for an affordable automobile hail shield that fits most vehicles and which is strong enough to resist large hailstones. Further, there is a need in the art for this automobile hail shield to be lightweight and to have all of its attachments devices incorporated into the shield so that it can be unrolled and quickly and easily for installation on a vehicle by a single person. Additionally, there is a need in the art for the attachment scheme to minimize stress on the cover material while providing attachment strength suitable for use in high winds. Finally, there is a need in the art for this hail shield to be compactly storable such that it can be kept in a car trunk when not in use.

SUMMARY OF THE INVENTION

A hail shield is provided which consists of a laminated design, having multiple layers of resilient shock-absorbing material for padding, strength and shape. In a first embodiment, an outer layer of high density polyethylene ("HDPE") plastic sheet, such as "VOLEXTRA" (Trademark), laminated to foam by a coextruded process or glued to a CCF foam, to produce a 2-ply covering material. In a preferred embodiment, a thin vinyl scrim or polyethylene sheet is layered between the HDPE mesh and the closed cell foam to provide a 3-ply covering material. The shield is constructed of two generally rectangular top panels affixed to each other along their common longest sides, each top panel being flanked by generally trapezoidally-shaped side panels. The seams between the panels are constructed using a sewing technique which produces a reflexive joint between the panels, tending to fold the panels towards each other, and giving the over all car shield a reflexive tendency to "grip" the car to increase the attachment security of the shield. The outer edges of the panels are bordered by sleeves through which elastic shock cords pass. Hooks affixed to the ends of the shock cords provide the means for attachment to the car's exterior at points such as holes in wheels or wheel covers. The design of the car shield allows for compact folding and rolling of the shield for convenient storage in a duffle-type bag in the car trunk when not in use, and includes a reflexive seam design which causes the shield panels to naturally fold in towards each other.

BRIEF DESCRIPTION OF THE DRAWINGS

The figures presented herein when taken in conjunction with the disclosure form a complete description of the invention, wherein elements and steps indicated by like reference indicators are the same or equivalent elements or steps.

DETAILED DESCRIPTION OF THE INVENTION

Figure 1:
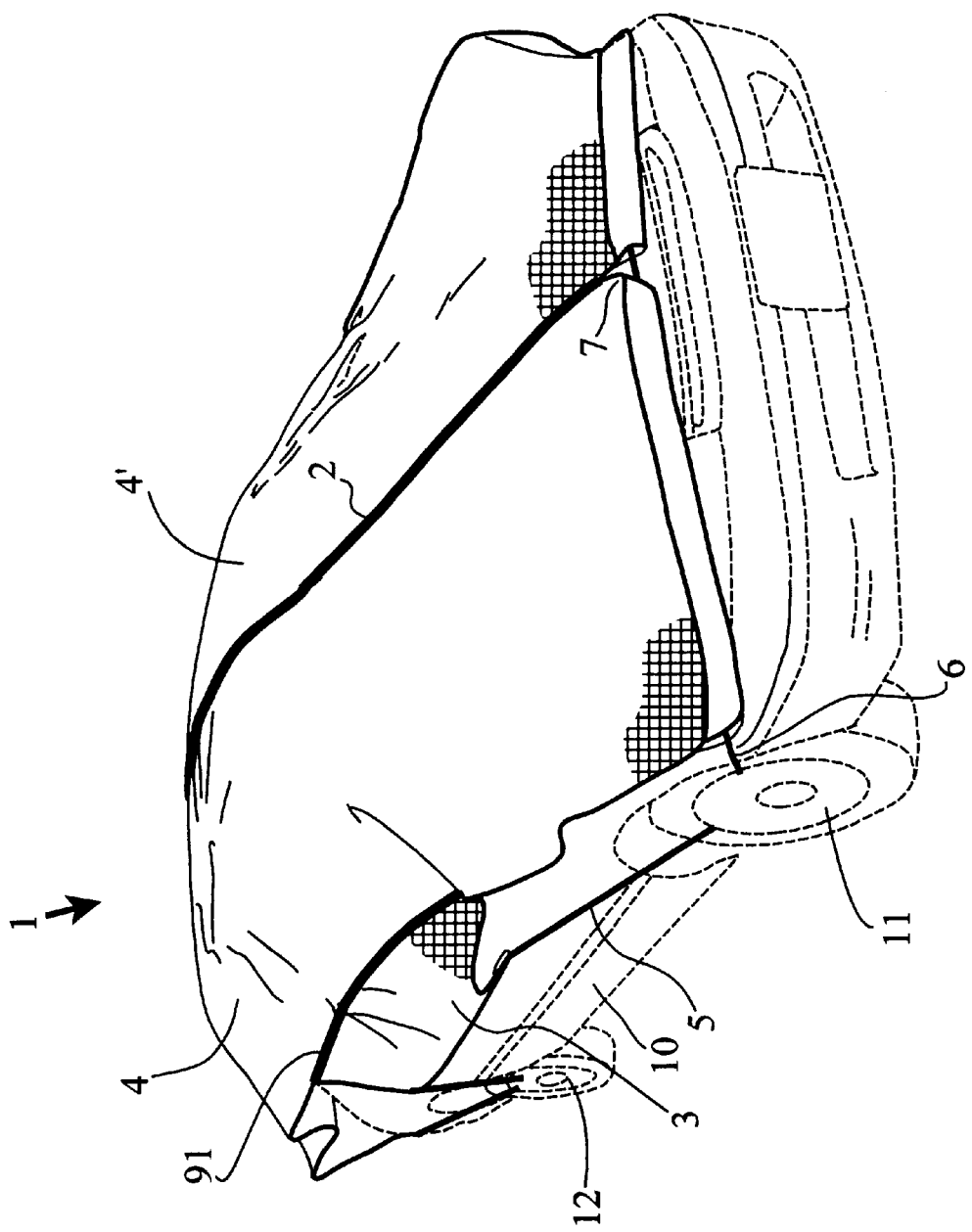
FIG. 1 is a frontal view of the invention when attached to an automobile.

FIG. 1 shows the preferred embodiment of the hail shield (1) when fully installed on an automobile (10). The retaining means (5 and 6) consists of elastic shock cords which run through sleeves formed at the edges of the shield. This allows the variance in distance or dimensions among different models of cars to be accommodated with a single hail shield design. The attachment hooks located at the end of the shock cords firmly affixed to the automobile at the front, back, and side locations of the automobile, typically in holes available in the wheel covers or the wheels (11 and 12) themselves, thus avoiding the need for special mounting hardware on the car. The hail shield has suitable width to provide protection to the automobile's upper surfaces to be protected.

The shield has two main top panels, a right top panel (4) and a symmetrically shaped top left panel (4'),with a center seam (2) between them. A right side panel (3) and its symmetrical counterpart a left side panel (3'—not shown in FIG. 1), depend downwards from the top panels, and provide protection for the side glass windows, opera panels, and upper portions of the door panels. The side panels are attached to the top panels by side seams (91 and 91'). In the preferred embodiment, the center seam (2) and side panel seams (91 and 91') are constructed with a particular technique described infra to produce a reflexive joint between the panels.

A front V-notch (7) is shown in FIG. 1, which allows the front edge of the shield to adapt to the contour of the front hood and grill. The center seam (2) allows the shield to be folded in half along the seam, with the V-notches (7 and 7') allowing the shock cord to fold without buckling.

After the shield is folded along the center seam (2) and side seams (91 and 91'), it can be rolled up in a front to back direction, and secured with additional shock cords around the rolled shield. In this state, the shield can be easily stored in the trunk of the car as the length of the roll is approximately half the width of the car itself. In the preferred embodiment, a duffle bag is supplied with the product to allow the rolled shield to be kept clean and free from snags from tools and other objects while in the trunk.

Figure 2:
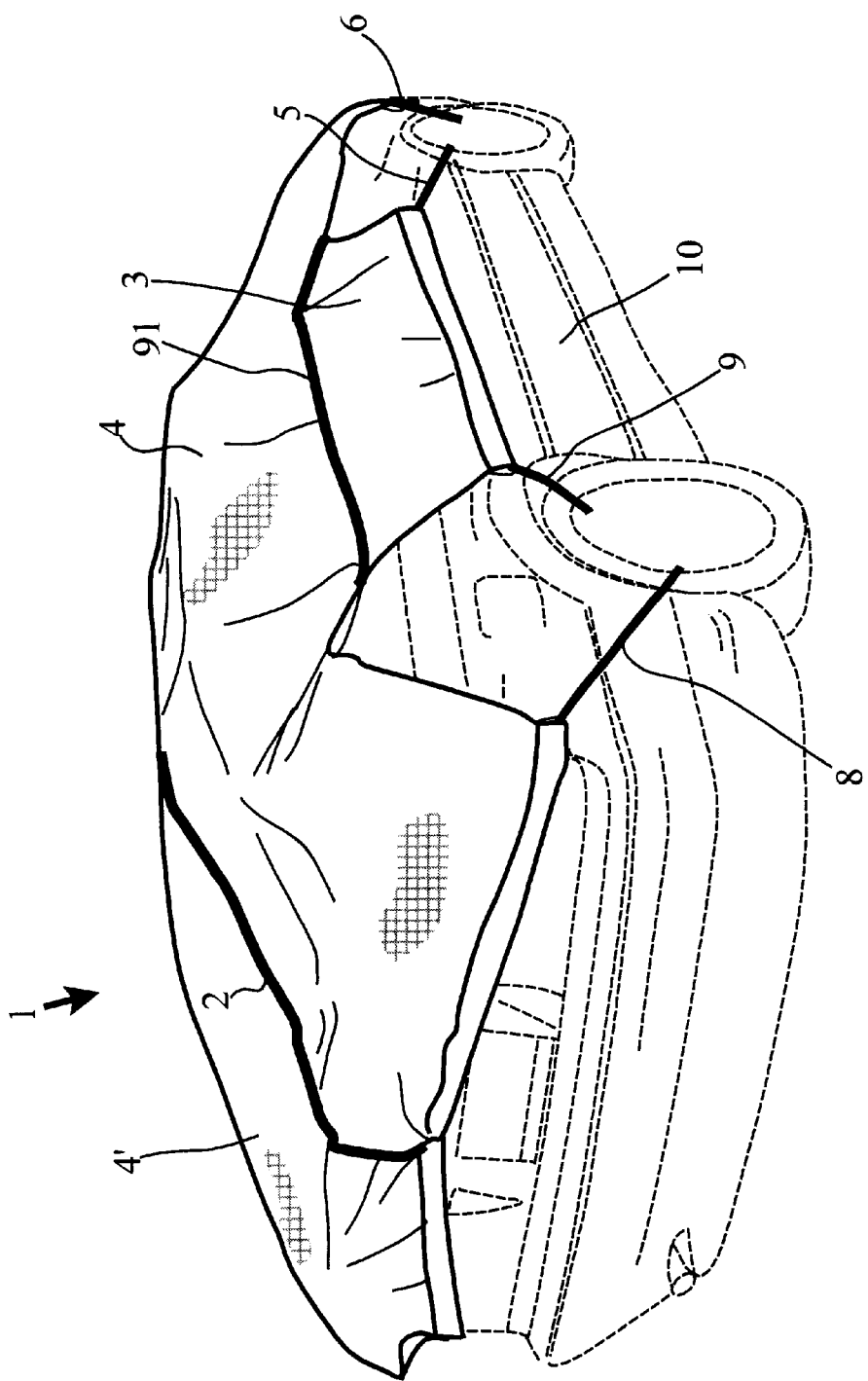
FIG. 2 is rear view of the invention attached to an automobile.

FIG. 2 shows the shield installed on an automobile from a perspective towards the rear of the car. In this view, the rear V-notch (7') can be seen and its function to allow the rear edge of the shield to mold to the contour of the car is even more noticeable.

Figure 3:
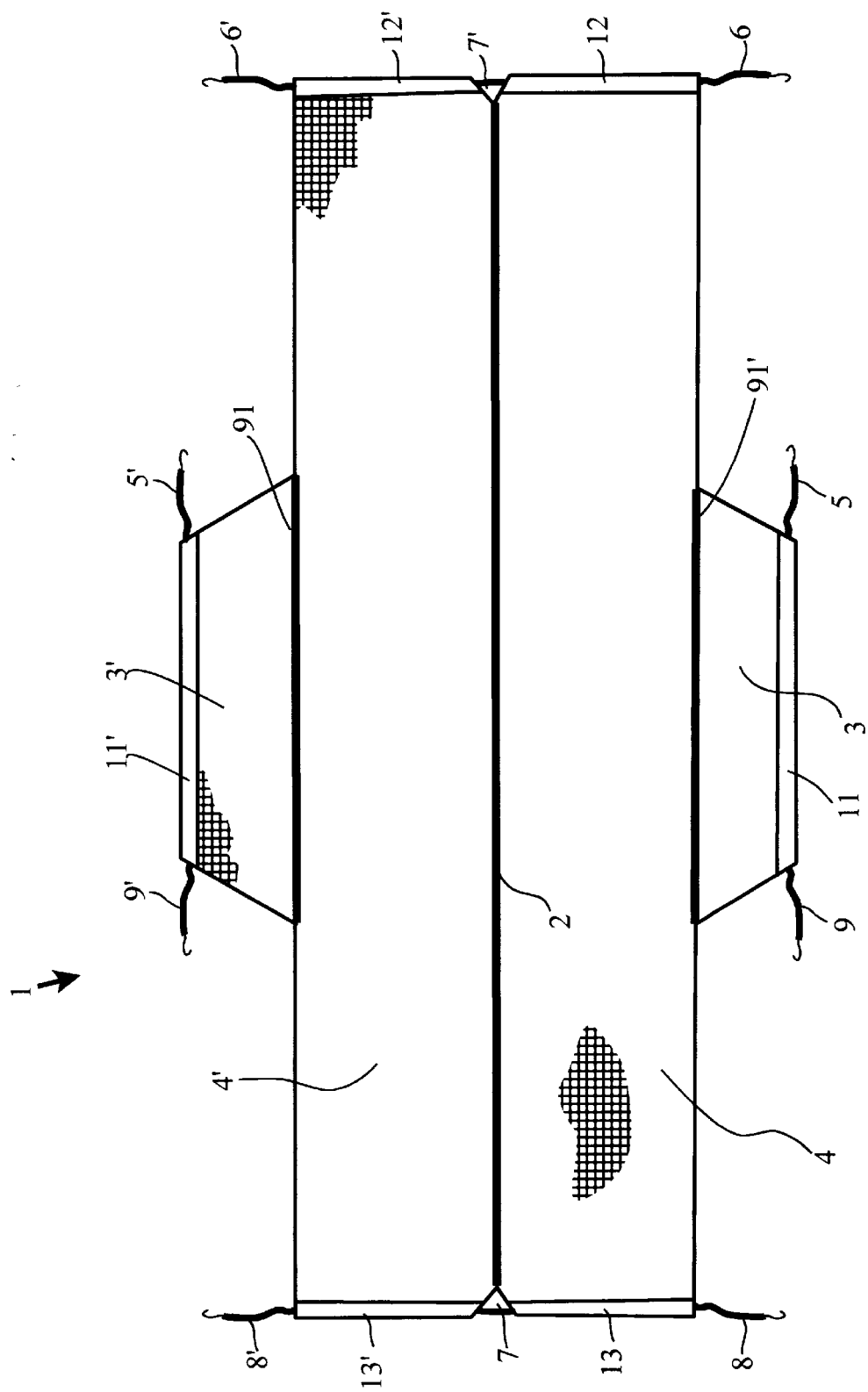
FIG. 3 is a top view of the invention placed flat on a surface in order to illustrate the multi-panel design with center seam.

Turning to FIG. 3, the shield panel design is illustrated from a top view with the shield placed out flat. The rectangular top panels (4 and 4') are joined together by the center seam (2). The top panels (4 and 4') are flanked on either side by the side panels (3 and 3'). The front edge of the shield is trimmed with a right front tubular sleeve (12) and a left front tubular sleeve (12'), between which is the front V-notch (7).

A front shock cord is placed through the front sleeve, with a right front shock cord end (6) and a left front shock cord end (6') extending from the front sleeve, as shown. The rear edge of the shield is likewise provided with a right rear sleeve (13) and left rear sleeve (13'), with a rear V-notch (7') between the rear sleeves, and a rear shock cord placed through the rear sleeves. A right rear shock cord end (8) and a left rear shock cord end (8') extend from the rear sleeves.

A right side panel (3), which is generally trapezoidal in shape in the preferred embodiment, is affixed by a right side seam (91) along the rightmost edge of the right center panel (4) opposite from the center seam (2), as shown. Along the right edge of the right side panel (3) is provided a right side panel tubular sleeve (11), through which is placed a right-side shock cord. The right-side shock cord rear end (9) and the right-side shock cord front end (5) extend from the right side panel sleeve. Similarly, a left side panel (3') is affixed by a left side seam (91') along the leftmost edge of the left center panel (4') opposite from the center seam (2), as shown. Along the left edge of the left side panel (3') is provided a left side panel tubular sleeve (11'), through which is placed a left-side shock cord. The left-side shock cord rear end (9') and the left-side shock cord front end (5') extend from the left side panel sleeve.

In the preferred embodiment, the overall length of the shield is approximately 18 feet from the front edge to the back edge, with the side panels being approximately 7 feet in length and placed generally at a position near the center of the shield. The width of the top panels is approximately 38 inches each, and the width of the side panels is approximately 16 inches each. These dimensions provide a car cover which fits a wide variety of cars, but they may be altered to accommodate much larger and much smaller cars and vehicles.

Figure 4:
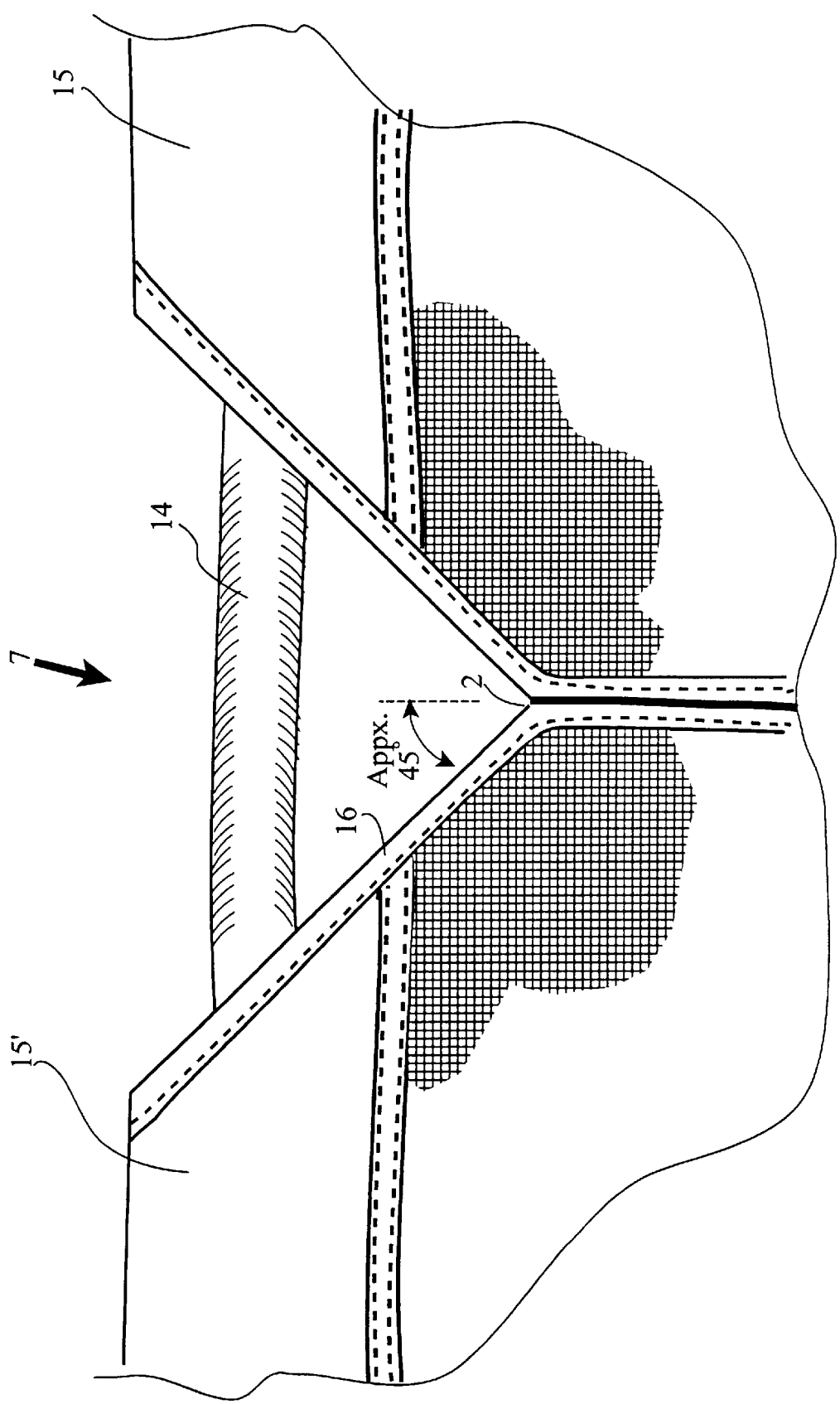
FIG. 4 is a detail view of the V-notch area of the shield.

FIG. 4 shows details of the center V-notch (7 or 7'). A shock cord (14), is shown exposed from the left and right tubular sleeves, so that when the shield is folded along the center seam (2), the cord can be folded without buckling the sleeve material. The notch shown in FIG. 4 corresponds to both the front V-notch (7) and the rear V-notch (7') as shown in FIGS. 1 through 3. The tubular sleeves (15 and 15') shown in FIG. 4 correspond to the right front sleeve (12), the left front sleeve (12'), the right rear sleeve (13) and the left rear sleeve (13') as shown in FIGS. 1 through 3. The tubular sleeves (15 and 15') are formed by folding a solid textile material, such as the polyethylene sheeting used for the center ply of the preferred embodiment, back upon itself and securing it to itself to form an open-ended sleeve. The preferred method of securing the textile material to itself is by stitching along a strip of border trim bias tape (16), but other suitable methods such as heat bonding or glueing may be employed. The HDPE mesh may be easily terminated under the bias tape, as well, such that it does not extend beyond the tape to form a part of the sleeve. The center seam (2) is shown in FIG. 4, which preferably includes a welt cord and side-to-side stitching to form a reflexive seam as described infra.

Figure 5:
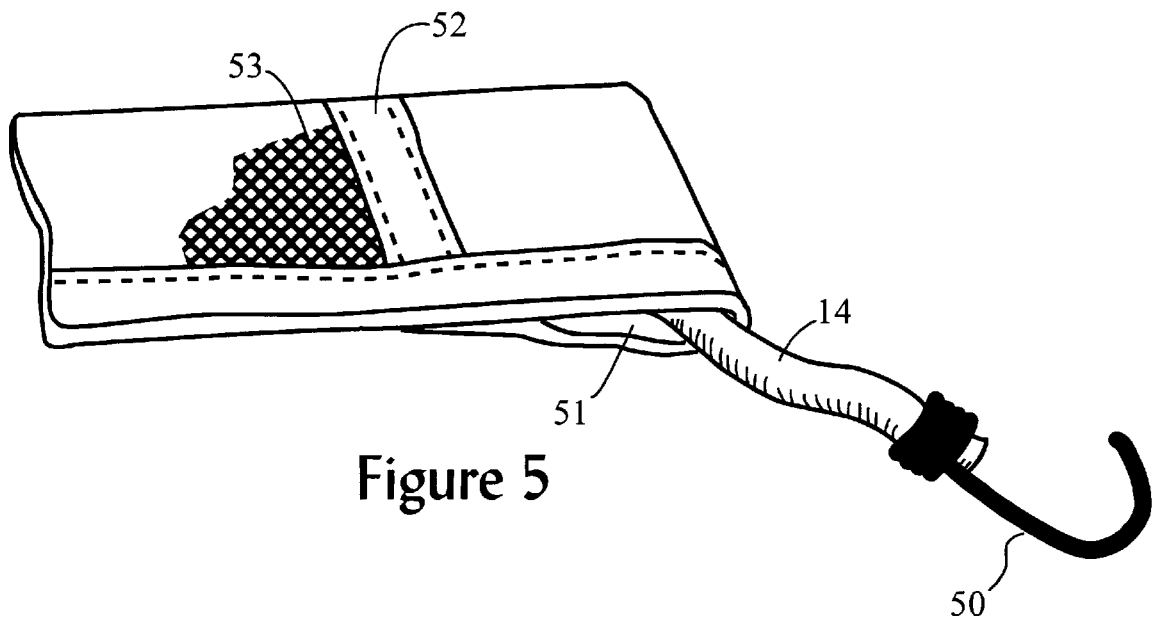
FIG. 5 is a detail view of the sleeve and shock cord arrangement.

FIG. 5 discloses a close-up view of a shock cord (14) with an attachment hook (50) which runs through and extends from a tubular shock cord sleeve (51). The outer ply (53) of HDPE mesh is terminated under the border trim bias tape (52), and the finished edge of the panel and sleeve end are also trimmed with bias tape. This general view is applicable to all of the extending ends of the front, rear, left and right shock cords as shown in FIGS. 1, 2, 3, and 4.

Figure 7:
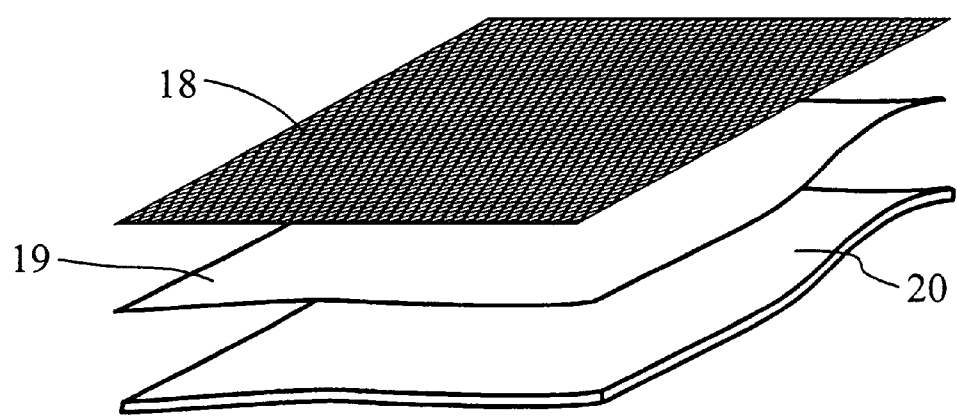
FIG. 7 is a cross-sectional view which illustrates the details of the laminated materials used in the panels of the shield.

In FIG. 7, a cross-sectional view of the laminated material employed for the panels is shown. The outer layer (18) is a high density polyethylene ("HDPE") screen mesh, preferably a ⅛ inch diamond mesh such as Duranet #155 by Naltex. The second layer (20) is a 3/32 inch thick closed cell cross link foam ("CCF"), such as "Volara" from Voltek. In a basic embodiment, these two layers may be attached to each other along the periphery of the panels by stitching and the border trim bias, or they may be bonded together by glue. A combined, ready-to-use product from Voltek called "VOLEXTRA" (TRADEMARK) has a 3/32 inch CCF layered with a HDPE plastic. In the preferred embodiment, a center layer (19) of 6 mil thick vinyl scrim or polyethylene sheet is placed between the outer HDPE mesh layer (18) and the CCF layer (20). In this case, the HDPE mesh is attached to the CCF and scrim around the periphery of the panels by sewing and border trim bias, and the CCF and scrim are glued to each other.

Figure 8:
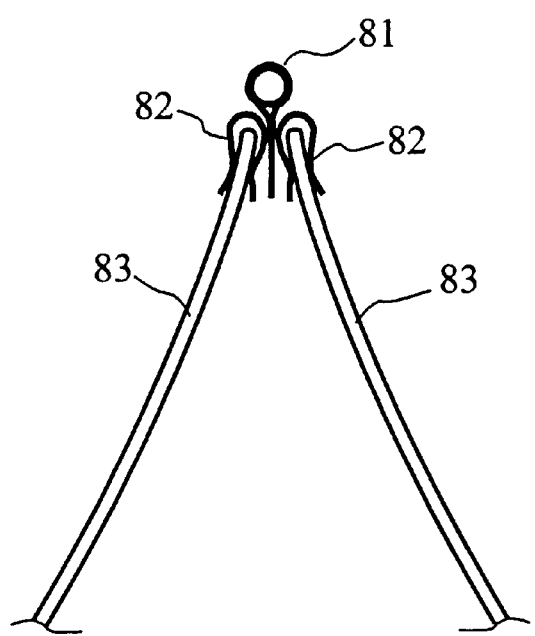
FIG. 8 is a detailed view of the construction of the reflexive fold lines employed in the preferred embodiment.
Figure 9:
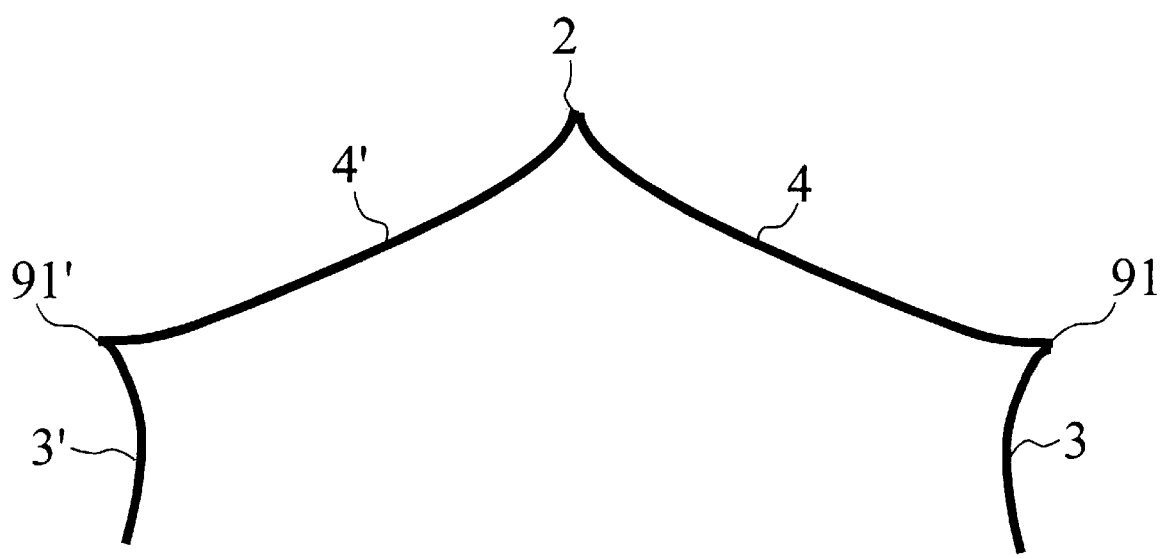
FIG. 9 illustrates the overall reflexive nature of the shield when the reflexive fold lines are incorporated into the shield construction.

FIG. 8 shows the preferred construction of the center seams and the side panel seams. This "reflexive" seam tends to pull the two panels together. A length of weltcord (81) is sewn between the bias tape (82) along the edges of the panel material (83), as shown. Because cross-stitching is used through the two bias tape pieces on opposing panel edges, the seam is "pinched" together and resists laying out flat. This type of seam design is preferably used on the center seam (2) and the side panel seams (91'), as shown in FIG. 9. This causes the entire hail shield to tend towards closure upon itself in a "reflexive" manner, which allows it to mold and clamp to the car in a tighter fashion that an ordinary flat-design car shield. This "reflexive" nature of the design increases the ability of the shield to stay in place during high winds or when the car is being transported on a truck.

Figure 6:
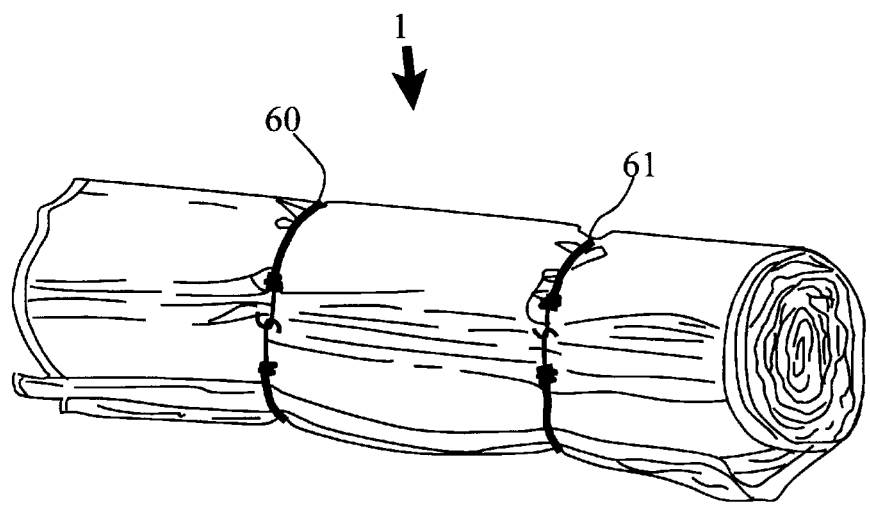
FIG. 6 shows the shield in the folded and rolled up storage state.

Turning to FIG. 6, the decreased storage size of the hail shield is obvious when it is in its folded and rolled state. Two ends of extra 30-inch shock cords (60 and 61) are wrapped around the rolled shield and hooked to each other, thereby providing a means for keeping the shield rolled up. Using the materials disclosed supra for the preferred embodiment with the panel dimensions disclosed, the rolled shield will be only 12½ inches in diameter, and can be placed in a duffle-type storage bag.

Particular note should be taken of the overall quickness and ease of the invention for mounting and removal to and from a car. Because the design allows for very compact storage, it may be stored in a car trunk with room to spare. When a storm is imminent, it may be quickly removed from the trunk and storage bag, unrolled and placed on the car. Due to its reflexive seam design, the shield tends to hold itself on the car while the shock cords are being secured to the car wheels. As no inflation or other steps are necessary, the shield is now completely installed. For removal of the hail shield one must only detach the shock cords, fold along the center and side seams, roll, and store in the bag. No deflation or other steps are necessary to remove and store the shield.

While specific materials, panel shapes, and construction techniques have been described in this specification, it will be appreciated by those who are skilled in the art that certain deviations in the materials, panel shapes and construction techniques do not depart from the scope and spirit of the following claims.

What is claimed is:

1. A cover suitable for protection of a vehicle from hail, falling debris, and road hazards, said cover comprising:
   a left top padded panel and a right top padded panel, each top panel having a generally rectangular shape, having two parallel long edges, having a front short edge and a rear short edge parallel to each other, an outer face and an inner face, said inner face being suitable for non-marring support by a vehicle surface;
   a left side padded panel and a right side padded panel, each side panel having a generally trapezoidal shape having two non-parallel edges, a long edge, and a short edge parallel to said long edge of the side panel, and each side panel having an outer face and an inner face, said inner face being suitable for non-marring support by a vehicle surface;
   a center seam for folding formed between a pair of long sides of said left top padded panel and said right top padded panel;
   a right side seam for folding formed between said long edge of said right side padded panel and the long edge of said right top padded panel opposite said center seam;
   a left side seam for folding formed between said long edge of said left side padded panel and the long edge of said left top padded panel opposite said center seam thereby forming a padded hail shield which may be used to cover the hood, front and rear windshields, top, trunk lid, side windows and upper side panels of a vehicle;
   a front cord tubular sleeve formed along said front short edges of said top padded panels;
   a rear cord tubular sleeve formed along said rear short edges of said top padded panels;
   a right cord tubular sleeve formed along said short edge of said right padded panel;
   a left cord tubular sleeve formed along said short edge of said left padded panel;
   a front shock cord having two ends, and having a means for attaching said cord to a car disposed at each end of said front shock cord, said front shock cord being disposed in and through said front cord tubular sleeve;
   a rear shock cord having two ends, and having a means for attaching said cord to a car disposed at each end of said rear shock cord, said rear shock cord being disposed in and through said rear cord tubular sleeve;
   a right shock cord having two ends, and having a means for attaching said cord to a car disposed at each end of said right shock cord, said right shock cord being disposed in and through said right cord tubular sleeve; and
   a left shock cord having two ends, and having a means for attaching said cord to a car disposed at each end of said left shock cord, said left shock cord being disposed in and through said left cord tubular sleeve such that said cover may be secured to a vehicle and held in place by affixing said attachment means of said front, rear, right and left shock cords to said vehicle.

2. A cover suitable for protection of a vehicle as set forth in claim 1 wherein said means for attaching said shock cords comprises hooks.

3. A cover suitable for protection of a vehicle as set forth in claim 1, further comprising:
   a front V-notch disposed along said front edges of said top padded panels and centered upon said center seam, said front V-notch having sufficient depth to cross said front tubular sleeve; and
   a rear V-notch disposed along said rear edges of said top padded panels and centered upon said center seam, said rear V-notch having sufficient depth to cross said rear cord tubular sleeve such that said front a rear shock cords are exposed in said front a rear V-notches, allowing for more compact folding of the cover along said seam.

4. A cover suitable for protection of a vehicle as set forth in claim 1 wherein said center seam, left side seam and right side seam are reflexive seams.

* * * * *